June 9, 1931.  J. P. McLIMANS  1,809,210
SECTIONAL BUCKSTAY
Filed Jan. 30, 1929  2 Sheets-Sheet 1
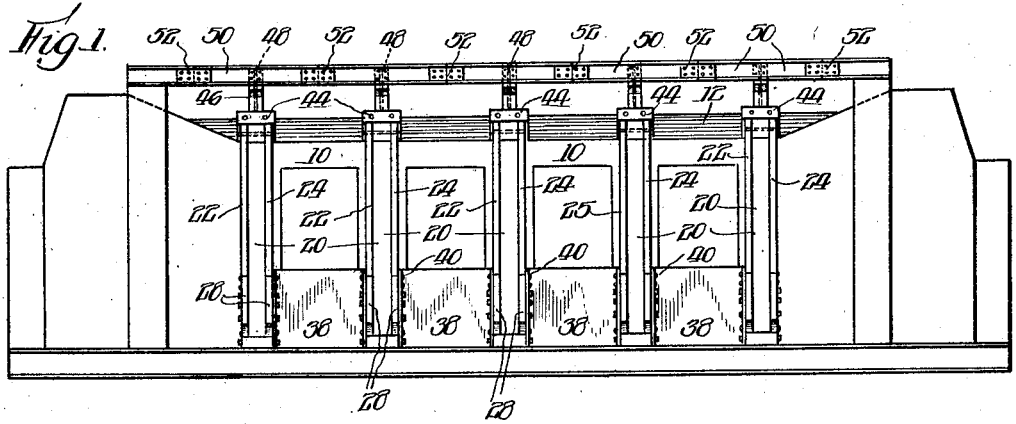
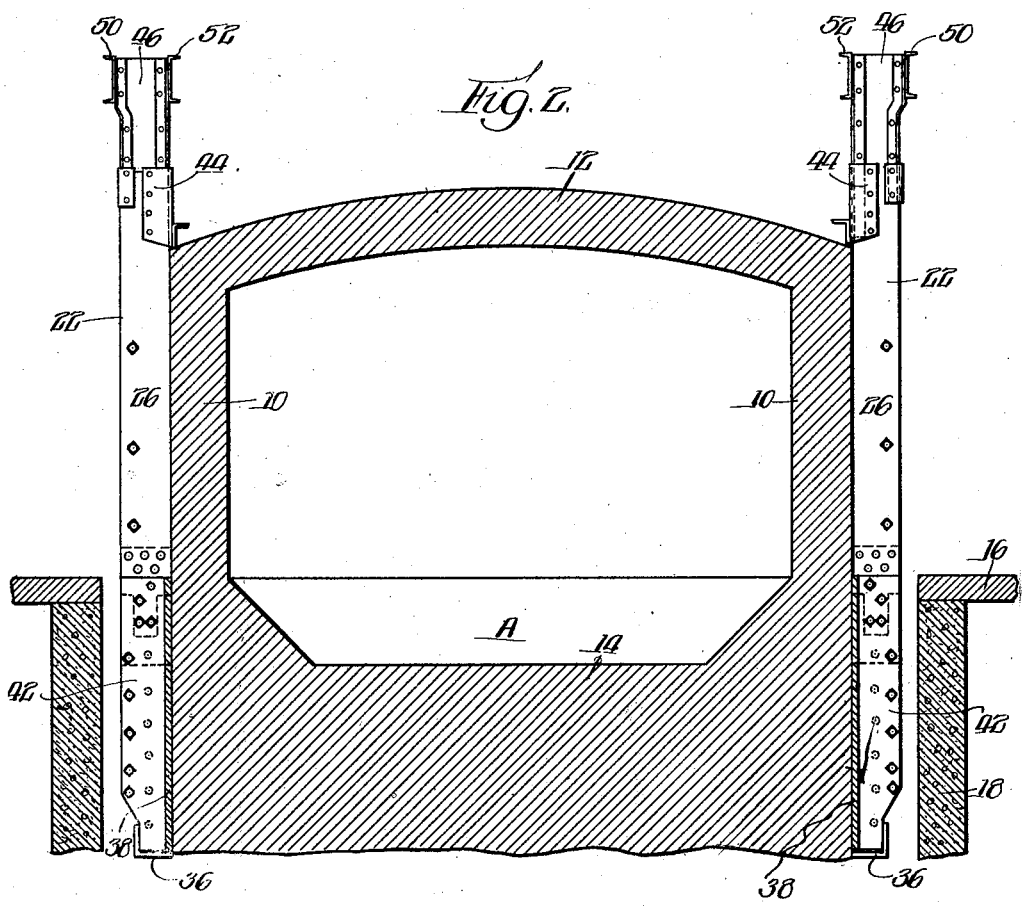
Inventor:
John P. McLimans
By Usina and Rauber
Attys June 9, 1931.  J. P. McLIMANS  1,809,210
SECTIONAL BUCKSTAY
Filed Jan. 30, 1929   2 Sheets-Sheet 2
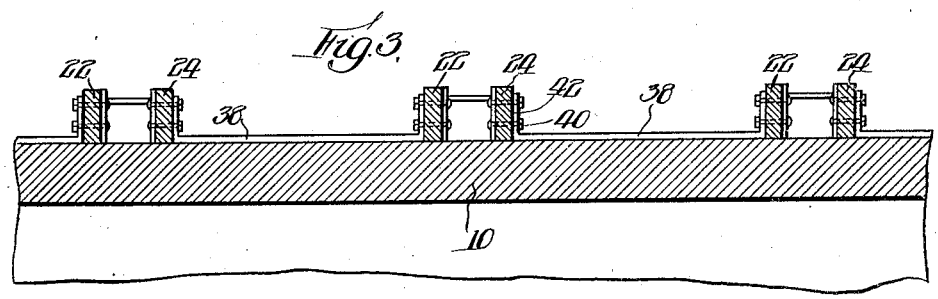
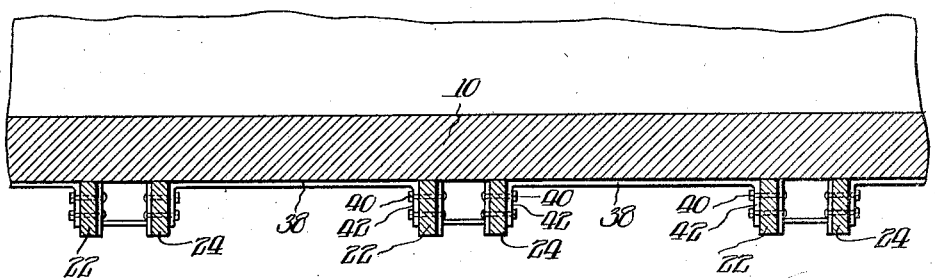
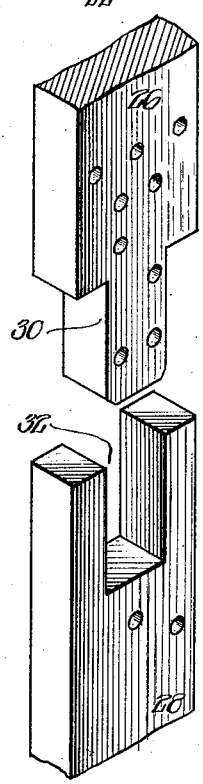
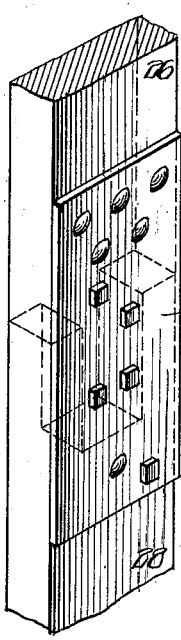
Inventor:
John P. McLimans,
By Haines and Rauber
Attys Patented June 9, 1931

1,809,210

UNITED STATES PATENT OFFICE

JOHN P. McLIMANS, OF DULUTH, MINNESOTA

SECTIONAL BUCKSTAY

Application filed January 30, 1929. Serial No. 336,252.

This invention relates to furnaces and the like and is illustrated herein in connection with a furnace of the open hearth type.

In the operation of open hearth furnaces, it sometimes happens that the side walls give way and the molten metal and slag being treated within the basin of the furnace flow out through the opening so formed and pour onto the floor surrounding the furnace. This burning away or other destructive quality of the side wall of the furnace causes great inconvenience by reason of the fact that it renders the furnace inoperative for a time, and causes still greater disorder inasmuch as the task of taking care of the molten metal and slag during the repairing of the furnace and subsequently thereto, is extremely laborious.

According to processes now in use of repairing and again placing in operation furnaces that are damaged in this manner, the molten metal and slag are permitted to cool and the roof of the furnace is removed in order to facilitate the repairing of the injured wall. When the furnace has been repaired, the chilled slag and metal are broken up and the next undertaking is to return the broken masses to the hearth, or basin, of the furnace. This however, in most instances, is extremely difficult since the pieces to be charged are so large as to require the employment of a crane or other hoisting apparatus, and the distance between the crane hook and the top of the furnace in the usual plant installation is so small that it is impracticable and in many instances impossible to hoist these pieces over and drop them into the furnace from the top.

In such instances, one of two courses may be followed: first, at a great expense, the chilled metal and slag may be broken up into pieces sufficiently small to permit them to be charged in the manner in which a furnace is charged at the commencement of a cycle of operations, and second, the side wall of the furnace may be torn down to increase the clearance space between the wall of the furnace and the crane hook.

Heretofore, furnaces of this type have generally been constructed with side walls reenforced by vertically extending buckstays which reach from the top of the furnace downwardly past the chill line to the bottom of the furnace. These members have heretofore been constructed in a single piece and when it has been desired to tear down a part of the side wall of the furnace it has been necessary first to remove the entire buckstays in order to afford an unobstructed opening. Removing of the entire buckstays is an extremely expensive, burdensome, and impracticable procedure owing to the fact that the very mounting of the buckstays and the shape and disposition of the furnace and other abutting parts are such as to make the buckstay more or less permanent in character, a "fixture" so to speak.

In view of the foregoing considerations, the present invention has for an important object thereof the provision of buckstays constructed and arranged to permit their ready removal from the furnace whereby the wall may be torn down with less expense and inconvenience than has heretofore been possible.

An important feature of the invention which aims toward the accomplishment of the recited object consists in the provision of a buckstay for furnace use that is comprised of a plurality of sections which are normally bolted together to form a rigid, or unitary ensemble. By means of such a provision, a portion only of the buckstay may be removed without interfering with the remainder thereof.

It is another characteristic of such furnace constructions that the lower portion of the buckstay is the only part that is in its nature, owing to its location, permanent, and it is therefore another feature of this invention to provide a buckstay having its upper portion composed of a separable, or detachable, section in order that it may be easily removed without disturbing the fixed, or permanent, lower part.

There are many other extremely important features and objects of the present invention and they will be made apparent in the following description and the appended claims, it being sufficient to this point only to express the general purposes, functions, and utility of the invented structure.

By way of illustration one of a great many different embodiments of the invention is illustrated in the accompanying drawings, in which—

Figure 1 is a view in front elevation of an open hearth furnace equipped in accordance with the present invention;

Figure 2 is a view in side elevation in section of the furnace shown in Figure 1;

Figure 3 is a plan view in section of the furnace of Figure 1;

Figure 4 is a view in perspective illustrating in detail certain features of the invention;

Figure 5 is a view of the parts shown in Figure 4 showing them in a different relationship; and Figure 6 is still another view of the parts shown in Figure 4, but includes in addition thereto some further parts of the ensemble.

In Figure 1, there is shown the charging side of an open hearth furnace and this figure, together with Figure 2, discloses the furnace as comprising side walls 10, a roof 12, and a base 14 which, together with the side walls, forms a basin A for the reception of ore, metal, etc. that is to be submitted to a heat treating operation.

The floor of the furnace room is indicated by the reference numeral 16 in Figure 2 and terminates, it will be noticed, in a vertical wall 18 which is spaced slightly from the outer wall of the furnace for a purpose which will hereinafter be more fully described. It is pointed out, however, that furnaces of this character are known to have a "chill line" which serves as a guide in operating the furnace and this line is of approximately the same height, in most furnaces and furnace room constructions, as the floor 16 which adjoins the furnace.

It has been heretofore stated that during the operation of the furnace, the side walls occasionally fall away leaving a gaping hole in the side of the furnace through which the molten metal and slag flow. To the end of reenforcing the side walls the furnace is provided upon each side with a plurality of uniformly spaced buckstays 20 which serve as reenforcements.

It has furthermore been pointed out that sometimes it is desired to remove a portion of the side wall of the furnace to permit the insertion into the furnace basin of a large mass of material that has escaped therefrom at the time the brake in the side wall occurred, and in order to permit such removal it is necessary first to remove the buckstays or at least such portions of them as are in the way. In view of this fact, the buckstays illustrated in the drawings are of a unique and very desirable construction and the next few paragraphs will be devoted to setting forth a full explanation of the construction and operation of these invented members.

As illustrated, the buckstays each comprise a plurality of spaced, vertically extending members or columns 22 and 24 and each of these columns in turn comprises an upper portion 26 and a lower portion 28. As illustrated in Figures 4 and 5, the lower terminal portion of the upper section 26 is provided with a tongue 30 which is shaped to fit within a groove or recess 32 formed in the upper extremity of the lower section 28. When the two terminal portions are interfittingly engaged with one another they are joined rigidly together by means of a splice-plate 34 which is provided with a plurality of fastener receiving apertures arranged to register with similar apertures formed in the terminal portions of the sections 26 and 28.

The lower sections 28 of the buckstays are disposed with their bases resting inside of angle-irons 36 that are fixed rigidly in position.

In order to insure the several buckstays as being properly spaced apart there are provided a plurality of flat metallic wall plates 38 which are normally disposed between adjacent buckstays and are secured in place by means of bolts or other suitable fasteners 40 which extend through flanges 42 (Figure 3) and thence through apertures in the lower sections 28.

As shown in Figure 6 the wall plates 38 extend upwardly to a point above the line of junction between the upper section 26 and the lower section 28 of the buckstay and the flange 42 expands and covers the splice-plate 34 that is located at the line of junction. Thus, the bolts 40 which pass through the flange at this point pass also through some of the openings in the splice-plate 34, and likewise through the terminal portions of the buckstay sections, thereby rigidly joining all of such parts together. This concludes a brief description of the construction and arrangement of the lower portions of the buckstays, and attention will now be given to a consideration of the upper portions of the buckstays.

As illustrated, the members 22 and 24 continue upwardly in spaced relationship to a point above the roof 12 of the furnace whereupon they are terminated and encircled by a collar member or members 44. At this point, however, a suitable post or standard, herein illustrated in the form of an I-beam 46 extends on upwardly from between the two spaced members 22 and 24 and is joined at 48 in a flange to flange arrangement with a plurality of spaced beams 50 and 52. Each of the posts 46 really carries a short section of the spaced beams 50 and 52 whereby such beams and posts constitute a T-shaped projection reaching from the upper extremity of each buckstay. The cross-bars of the T-shaped members terminate in abutting relationship with one another and adjacent extremities are joined together rigidly by means of splice-plates 52 whereby the joined cross-bars constitute a stiff girder or beam extending along and above the top of the furnace to provide a support for the upper ends of the buckstays.

In operation, when it is desired to remove a portion of the buckstay in order to facilitate the repair or removal of a portion of the side wall of the furnace, the fasteners 40 which hold in place the wall plates 38 are first removed whereupon the plates are hoisted out of the space between the vertical floor wall 18 and the side wall of the furnace. When this has been accomplished, the splice-plates 34 are exposed and may next be removed from those buckstays that it is intended to displace from the side wall of the furnace. After so doing, the upper splice-plates 52 may be removed at desired points to free the upper extremities of the buckstays which it is contemplated to remove.

When the foregoing requirements have been complied with the upper section of the buckstay is free of all rigid connections and may be removed easily to permit access to be gained to that portion of the side wall of the furnace normally disposed behind the buckstay. When the furnace has been recharged and the side wall and roof repaired, the buckstays may be reassembled by reversing the procedure just outlined without disturbing the lower, semipermanent, portion 42 of the buckstay.

Although the invention has been disclosed and described herein with particular reference to furnaces of the open hearth variety, it is to be understood that the invention is not necessarily limited in its application to furnaces of this type, but may be employed in connection with furnaces of all types. Furthermore, the invention is not necessarily limited to furnaces at all, but may be employed in analogous organization and may be useful in performing similar reenforcing functions regardless of the exact type of construction in connections with which it is used. It is also to be understood, of course, that modifications and changes in the illustrated embodiment of the invention may be made without departing in the slightest from the true scope of the invention as set forth in the appended claims.

Having described my invention, what I claim as new and desire to secure by United States Letters Patent, is:

1. A furnace construction comprising, in combination, a plurality of side walls, and a plurality of vertically extending buckstays associated with the side walls and arranged to reenforce the same, the lower portions of the buckstays being rigidly affixed in place and the upper portions thereof being separable from the lower portions to permit ready removal.

2. A furnace construction comprising, in combination, a plurality of side walls, and a plurality of vertically extending buckstays associated with the side walls for the purpose of reenforcing the same, each of said buckstays comprising a lower section rigidly and permanently attached to the furnace wall and an upper section detachably secured to said lower section and separable from the furnace wall, and means for detachably securing said section in alignment to form a rigid structure.

3. A metallurgical furnace construction comprising, in combination, a basin surrounded by a plurality of side walls, and a plurality of buckstays associated with the side walls for the purpose of reenforcing the same, each of said buckstays being comprised of a plurality of sections located one above the other and of such lengths that the lower section extends upwardly to a point approximately of the same height as the chill line of the basin of the furnace.

4. A furnace construction comprising, in combination, a plurality of side walls, a plurality of horizontally extending reenforcing beams located above the side walls, and a plurality of buckstays positioned at intervals along the side walls to afford reenforcement, said buckstays being arranged to extend between the horizontal reenforcing beams and the floor surrounding the furnace, each of said buckstays comprising a plurality of vertically alined sections, one of said sections being separable from the furnace wall and detachable from the other section so as to permit facile removal and said other section being rigid with the furnace wall so as to prevent facile removal.

5. A furnace construction comprising, in combination, a plurality of side walls, a plurality of horizontally extending reenforcing beams located above the side walls, and a plurality of buckstays positioned at intervals along the side walls to afford reenforcement, said buckstays being arranged to extend between the horizontal reenforcing beams and the floor surrounding the furnace, each of said buckstays comprising a plurality of vertically alined sections located one above the other, the lower section being rigid with the furnace wall so as to prevent facile removal and the upper section being separable from the furnace wall and detachable from the lower section so as to permit facile removal.

6. A furnace construction comprising, in combination, a plurality of side walls, a plurality of buckstays associated with the side walls for the purpose of reenforcing the same, each of said buckstays being comprised of a plurality of sections, one section being provided with a tongued portion and the other provided with a grooved portion adapted for interfitting relationship with the tongued portion, and a splice-plate for holding the sections in rigid alinement when the portions thereof are interfitted with one another.

7. A furnace construction comprising, in combination, a basin surrounded by a plurality of side walls, a plurality of horizontally extending reenforcing beams located above the side walls, and a plurality of buckstays positioned at intervals along the side walls to afford reenforcement, said buckstays being arranged to extend between the horizontal beams and the floor, each of said buckstays being sectional with the parts having interfitting terminal portions, and means for holding the sections in alinement with one another when the terminal portions are disposed in interfitting relationship.

Signed at Duluth, Minnesota, this 19th day of Jan., 1929.

JOHN P. McLIMANS.